(12) United States Patent
Nelson

(10) Patent No.: US 10,612,577 B2
(45) Date of Patent: Apr. 7, 2020

(54) TABLE BRACKET

(71) Applicant: Board by Design, Carbondale, CO (US)

(72) Inventor: Brad Reed Nelson, Carbondale, CO (US)

( * ) Notice: Subject to any disclaimer, the term of this patent is extended or adjusted under 35 U.S.C. 154(b) by 0 days.

(21) Appl. No.: 15/938,871

(22) Filed: Mar. 28, 2018

(65) Prior Publication Data

US 2019/0301504 A1    Oct. 3, 2019

(51) Int. Cl.
*F16B 12/50* (2006.01)
*F16B 12/44* (2006.01)

(52) U.S. Cl.
CPC ........ *F16B 12/50* (2013.01); *F16B 2012/446* (2013.01)

(58) Field of Classification Search
CPC ............................ F16B 12/50; F16B 2012/446
USPC ............... 403/169–176; 248/163.1, 188, 370
See application file for complete search history.

(56) References Cited

U.S. PATENT DOCUMENTS

| | | | | |
|---|---|---|---|---|
| 3,099,233 A | * | 7/1963 | Simpkins | F16B 12/50 108/156 |
| D208,524 S | | 9/1967 | Graham | |
| 3,472,539 A | * | 10/1969 | Fenwick | E04B 1/5831 182/224 |
| 4,187,649 A | * | 2/1980 | Chaffee | A47B 47/0008 312/140 |
| D264,049 S | | 4/1982 | Magner | |
| 4,368,998 A | | 1/1983 | Pestoor | |
| 4,516,376 A | * | 5/1985 | King | A47B 47/0008 403/171 |
| 4,630,550 A | * | 12/1986 | Weitzman | A47B 13/06 108/155 |
| 4,768,845 A | * | 9/1988 | Yeh | A47B 47/0008 312/257.1 |
| 5,066,161 A | | 11/1991 | Pinney | |
| D381,573 S | | 7/1997 | Sabounjian | |
| D418,047 S | | 12/1999 | Hirano | |
| D418,398 S | | 1/2000 | Hirano | |
| 6,247,869 B1 | | 6/2001 | Lichvar | |
| D477,527 S | | 7/2003 | Bradford | |
| 7,500,802 B2 | | 3/2009 | Patberg | |
| D592,492 S | | 5/2009 | Werschmidt | |
| D606,387 S | | 12/2009 | Werschmidt | |
| D630,305 S | | 1/2011 | Adams et al. | |
| 7,937,904 B2 | | 5/2011 | Davies | |
| D647,385 S | | 10/2011 | Watts | |
| D720,608 S | | 1/2015 | Yamaguchi | |
| D763,067 S | | 8/2016 | Monsees | |
| D763,670 S | | 8/2016 | Monsees | |
| 9,549,482 B2 | * | 1/2017 | Podemski | H05K 7/02 |
| D783,390 S | | 4/2017 | Nelson | |
| 10,309,680 B2 | * | 6/2019 | Ling | F24F 13/0209 |
| 2004/0091307 A1 | | 5/2004 | James | |

(Continued)

FOREIGN PATENT DOCUMENTS

GB              744294 A    *    2/1956    ............... A47F 5/14

*Primary Examiner* — Muhammad Ijaz

(57) ABSTRACT

A bracket has one main collar and two subsidiary collars. Each collar may be a deformed plate. The second end of each plate is disposed adjacent to and discrete from the first end of each plate. Each of the two subsidiary collars has an edge which is adjacent to the main collar. A portion of each subsidiary collar edge is secured to the main collar.

17 Claims, 11 Drawing Sheets

(56) References Cited

U.S. PATENT DOCUMENTS

| | | | | |
|---|---|---|---|---|
| 2011/0308063 A1* | 12/2011 | Feeleus | ............... | E04B 1/26 |
| | | | | 29/525.01 |
| 2013/0306808 A1* | 11/2013 | Huang | ............... | A47B 13/06 |
| | | | | 248/163.1 |
| 2017/0097030 A1* | 4/2017 | Keller | ............... | F16B 11/006 |

* cited by examiner

TABLE BRACKET

INTRODUCTION

Articles such as furniture often include joints where structural elements are joined together. These joints may be as simple as fasteners (e.g., screws or nails) secured at certain locations, or as complex as woodworking joints made from the structural material itself (e.g., tongue and groove, mortise and tenon, dovetail, or other types of joints). Discrete pieces of hardware also may be used for articles to ensure a connection between structural elements that is more robust than simple fasteners, but not as complex as woodworking joints.

SUMMARY

In one aspect, the technology relates to a bracket having: a main collar having a first deformed plate having a first end and a second end disposed adjacent to and discrete from the first end; a first subsidiary collar having a second deformed plate having a first end and a second end disposed adjacent to and discrete from the first end, wherein the first subsidiary collar includes a first subsidiary collar edge adjacent the main collar, and wherein at least a portion of the first subsidiary collar edge is secured to the main collar; and a second subsidiary collar having a third deformed plate having a first end and a second end disposed adjacent to and discrete from the first end, wherein the second subsidiary collar includes a second subsidiary collar edge adjacent the main collar, and wherein at least a portion of the second subsidiary collar edge is secured to the main collar. In an example, each of the main collar, the first subsidiary collar, and the second subsidiary collar include a respective axis, and wherein each of the main collar axis, the first subsidiary collar axis, and the second subsidiary collar axis are disposed substantially orthogonal to each other. In another example, each of the main collar, the first subsidiary collar, and the second subsidiary collar include a bolt spanning the first end and the second end of each of the respective collars, and wherein each of the bolts is configured to adjust a distance between the first end and the second end of each of the respective collars. In yet another example, the first subsidiary collar edge includes a plurality of edge sections, wherein one edge section of the plurality of edge sections is secured to the main collar. In still another example, at least one edge section of the plurality of edge sections is not secured to the main collar, so as to be deflectable relative to the main collar.

In another example of the above aspect, the plurality of edge sections includes: a first edge section adjacent the first end; a second edge section adjacent the first edge section; a third edge section adjacent the second edge section; a fourth edge section adjacent the third edge section; and a fifth edge section adjacent and between the fourth edge section and the second end. In an example, the first edge section and the fifth edge section are not secured to the main collar, so as to be deflectable relative to the main collar.

In another aspect, the technology relates to a bracket having: a main collar configured to be adjustably secured to a first elongate element; a first subsidiary collar secured to the main collar and configured to be adjustably secured to a second elongate element; and a second subsidiary collar secured to the main collar and configured to be adjustably secured to a third elongate element. In an example, each of the main collar, the first subsidiary collar, and the second subsidiary collar each include at least one bolt for adjustably securing a respective one of the collars about a respective one of the elongate elements. In another example, each of the main collar, the first subsidiary collar, and the second subsidiary collar include an axis, and wherein the main collar axis is disposed substantially orthogonal to both of the first subsidiary collar axis and the second subsidiary collar axis. In yet another example, the first subsidiary collar axis and the second subsidiary collar axis are disposed substantially orthogonal to each other. In still another example, the first subsidiary collar includes an edge facing the main collar, wherein the edge includes a length, and wherein less than an entire portion of the length is secured to the main collar.

In another example of the above aspect, the main collar includes a unitary bent plate having a first end and a second end disposed adjacent each other. In an example, the bracket further having a bolt adjustably connecting the first end to the second end. In another example, the first end defines at least one side surface of the main collar. In yet another example, the first end is disposed at an angle to an adjacent side surface of the main collar.

In another aspect, the technology relates to a method of manufacturing an article having a bracket having a main collar, a first subsidiary collar at least partially secured to the main collar, and a second subsidiary collar at least partially secured to the main collar, the method having: inserting a first elongate element into the main collar; inserting a second elongate element into the first subsidiary collar; inserting a third elongate element into the second subsidiary collar; and adjusting a dimension of at least one of the main collar, the first subsidiary collar, and the second subsidiary collar so as to secure therein a respective one of the elongate elements. In an example, adjusting a dimension includes turning at least one fastener. In another example, the fastener includes a bolt. In yet another example, adjusting a dimension includes adjusting a dimension of each of the main collar, the first subsidiary collar, and the second subsidiary collar.

BRIEF DESCRIPTION OF THE FIGURES

The following drawing figures, which form a part of this application, are illustrative of described technology and are not meant to limit the scope of the technology as claimed in any manner, which scope shall be based on the claims appended hereto.

DETAILED DESCRIPTION

Figure 1:
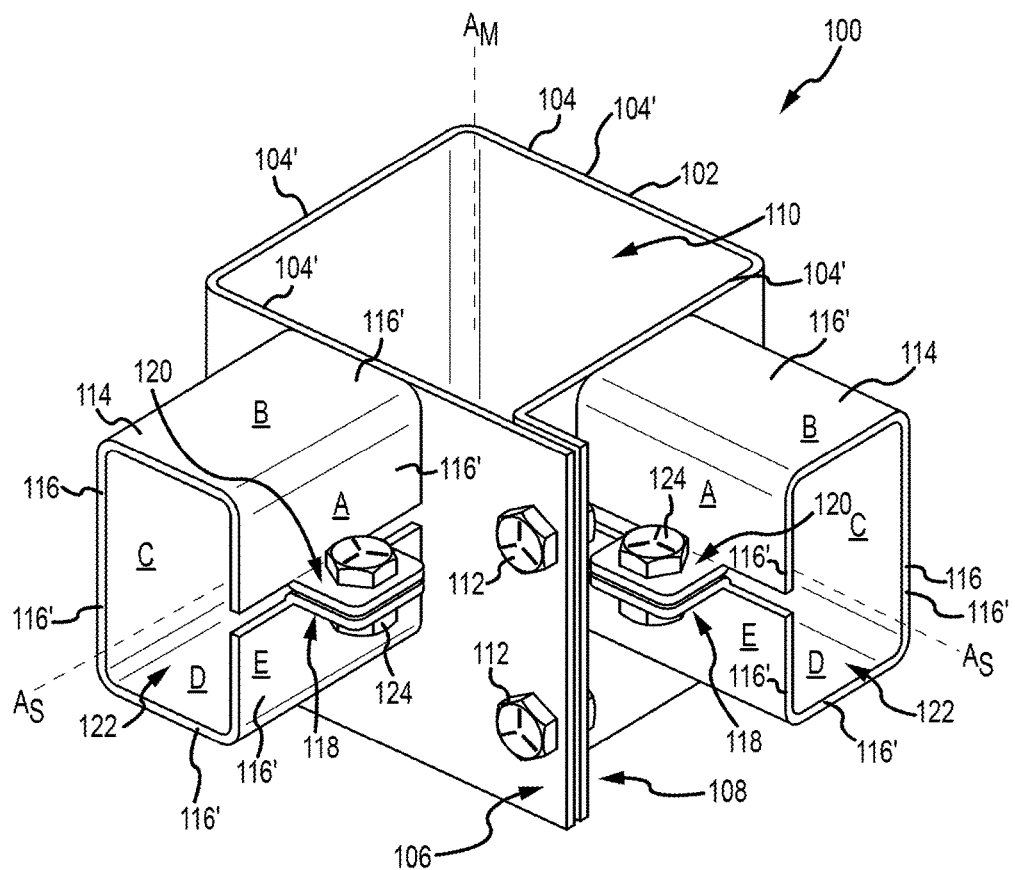
FIGS. 1 and 2 depict an upper perspective view and a lower perspective view, respectively, of a bracket for an article.
Figure 2:
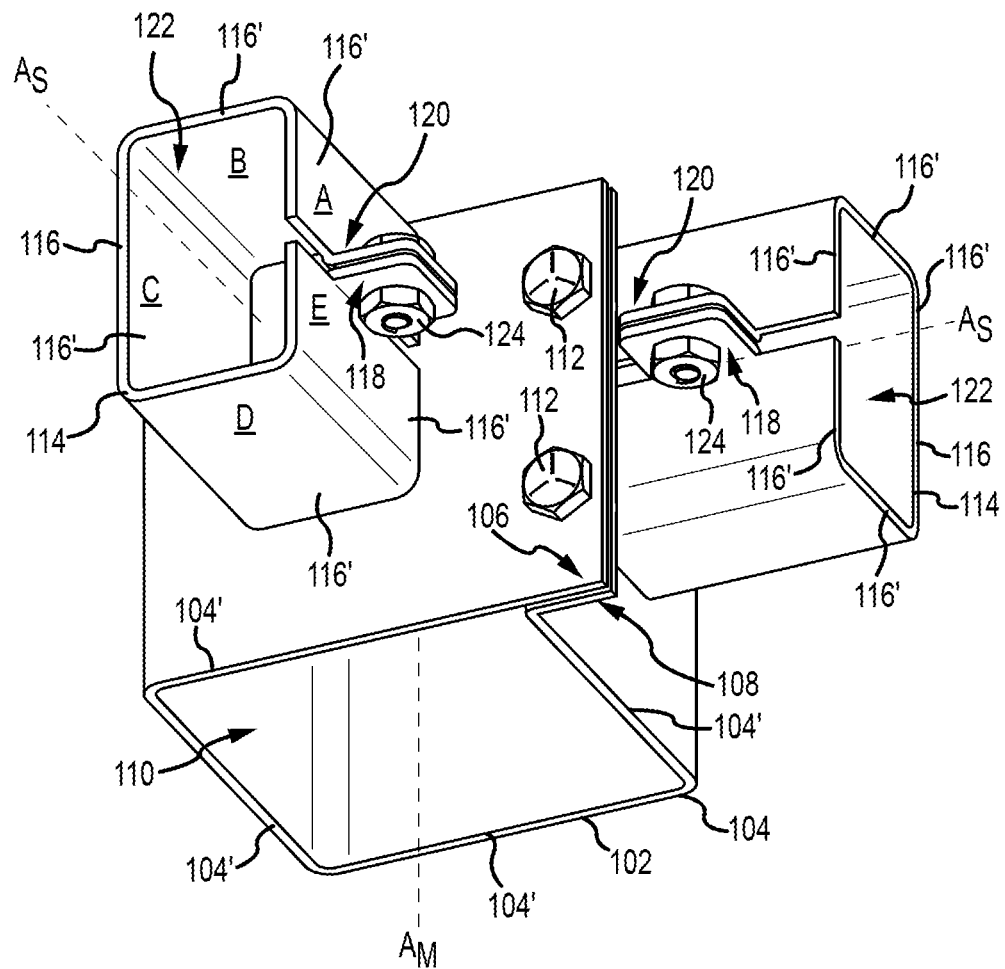
Figure 3:
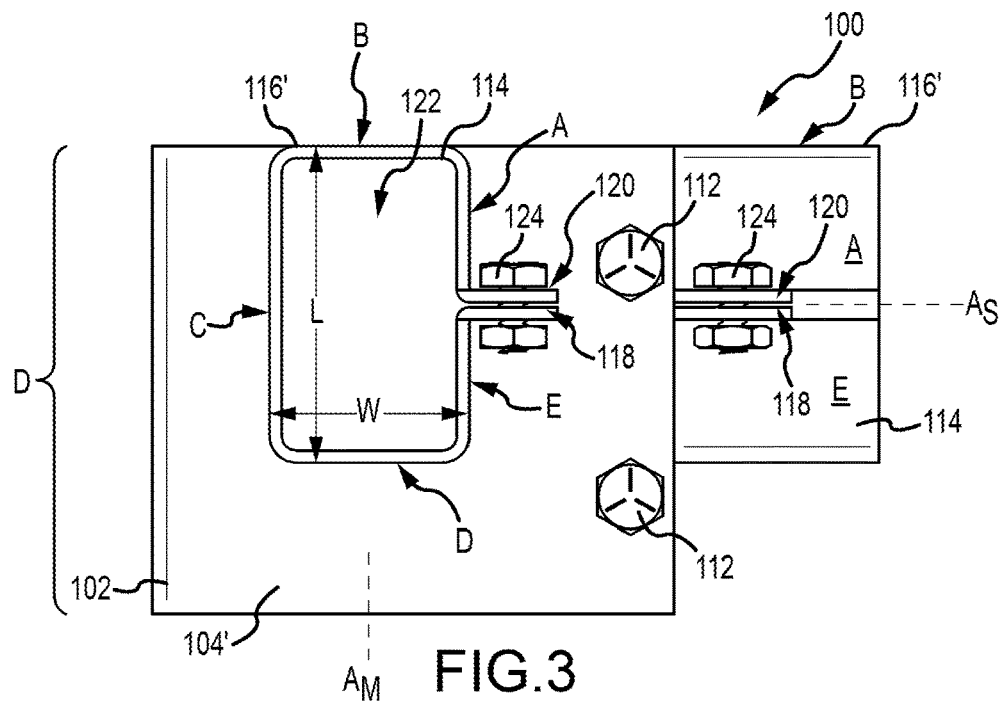
FIGS. 3-8 depict various orthogonal views of the bracket of FIGS. 1 and 2.
Figure 4:
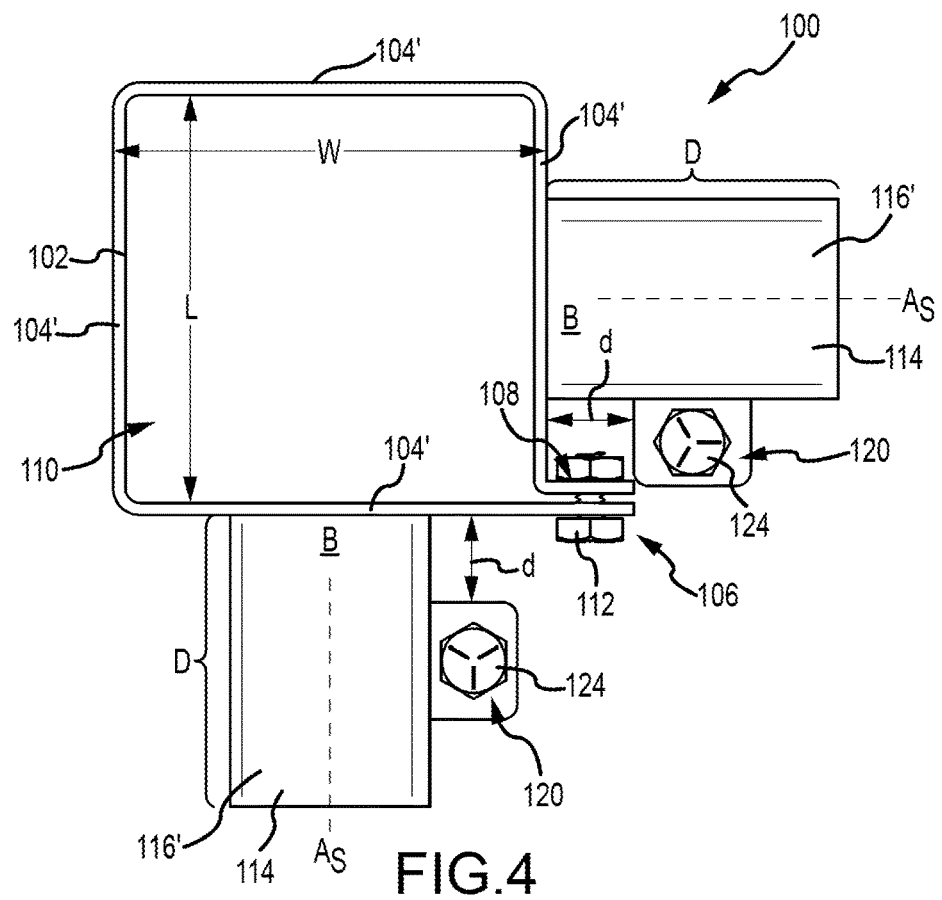
Figure 5:
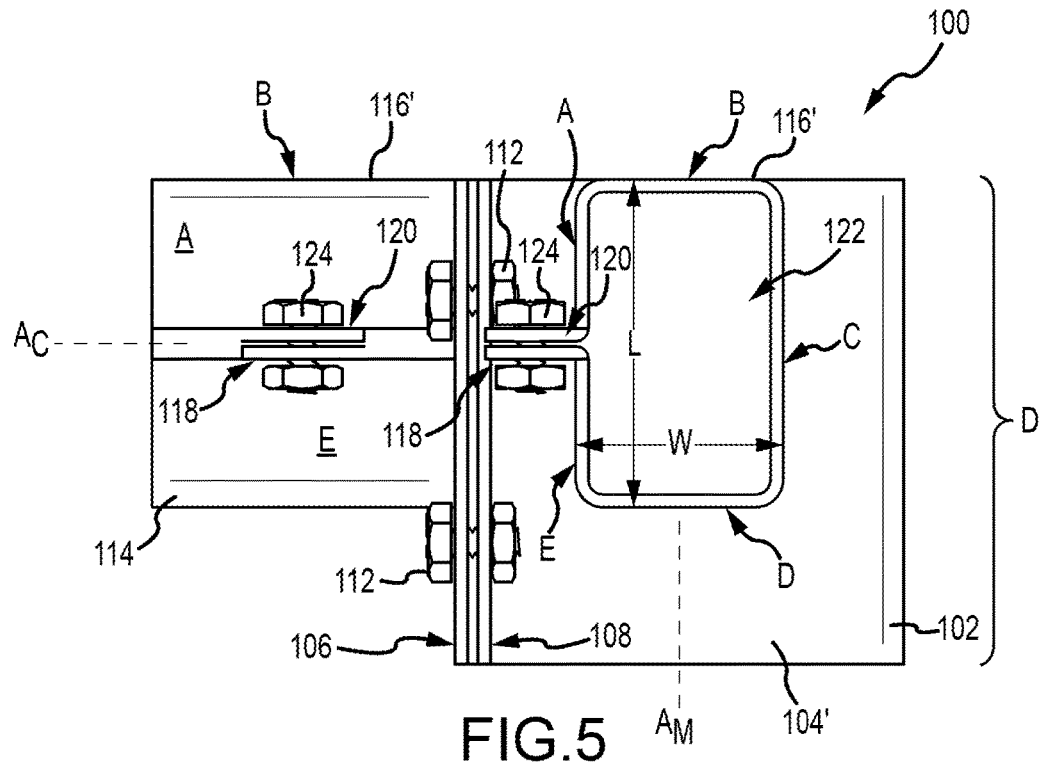
Figure 6:
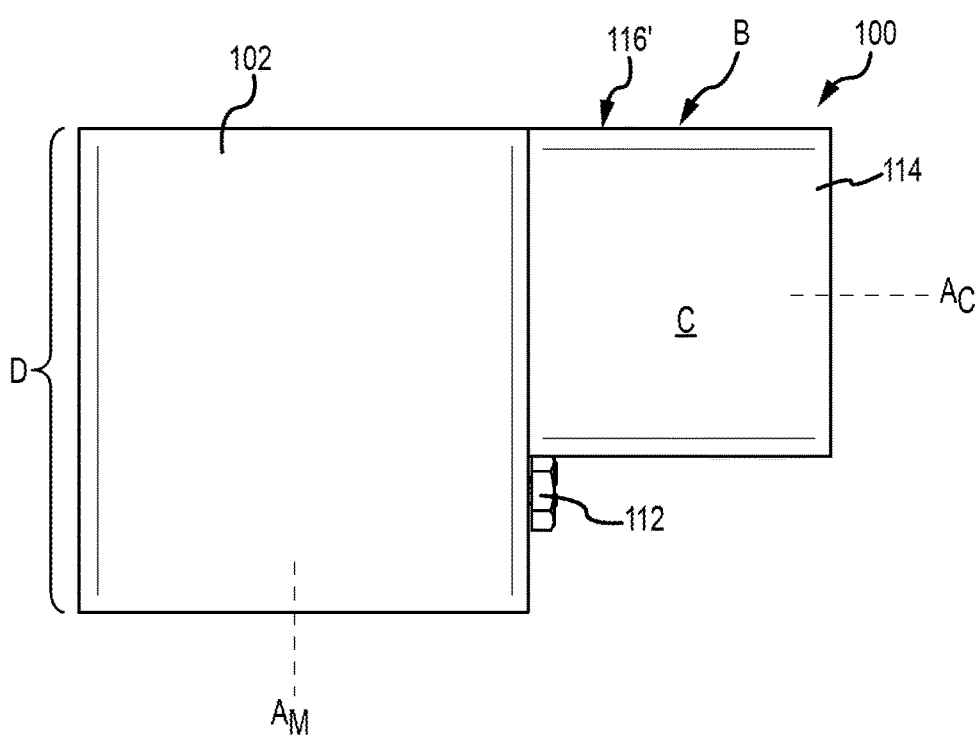
Figure 7:
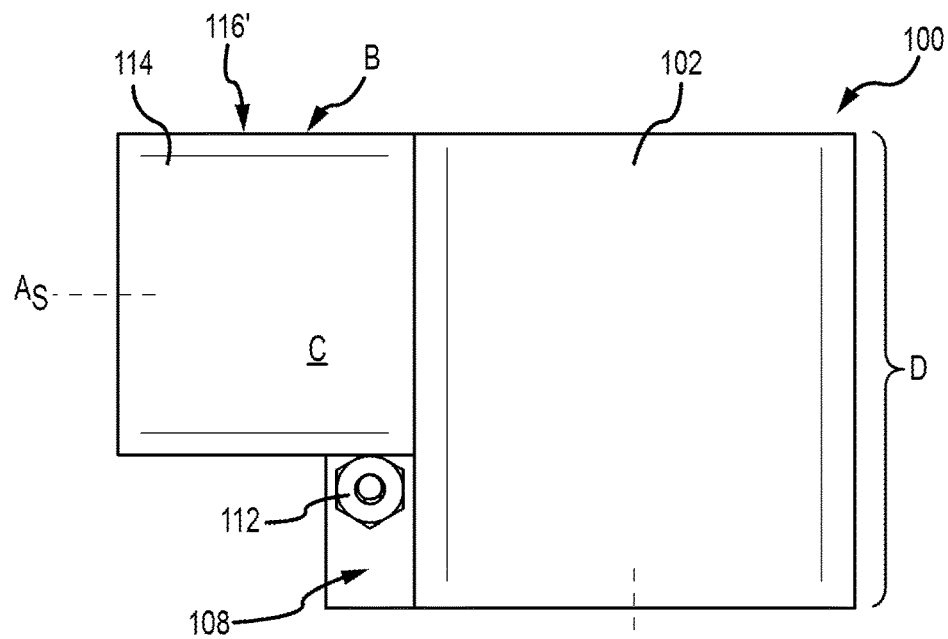
Figure 8:
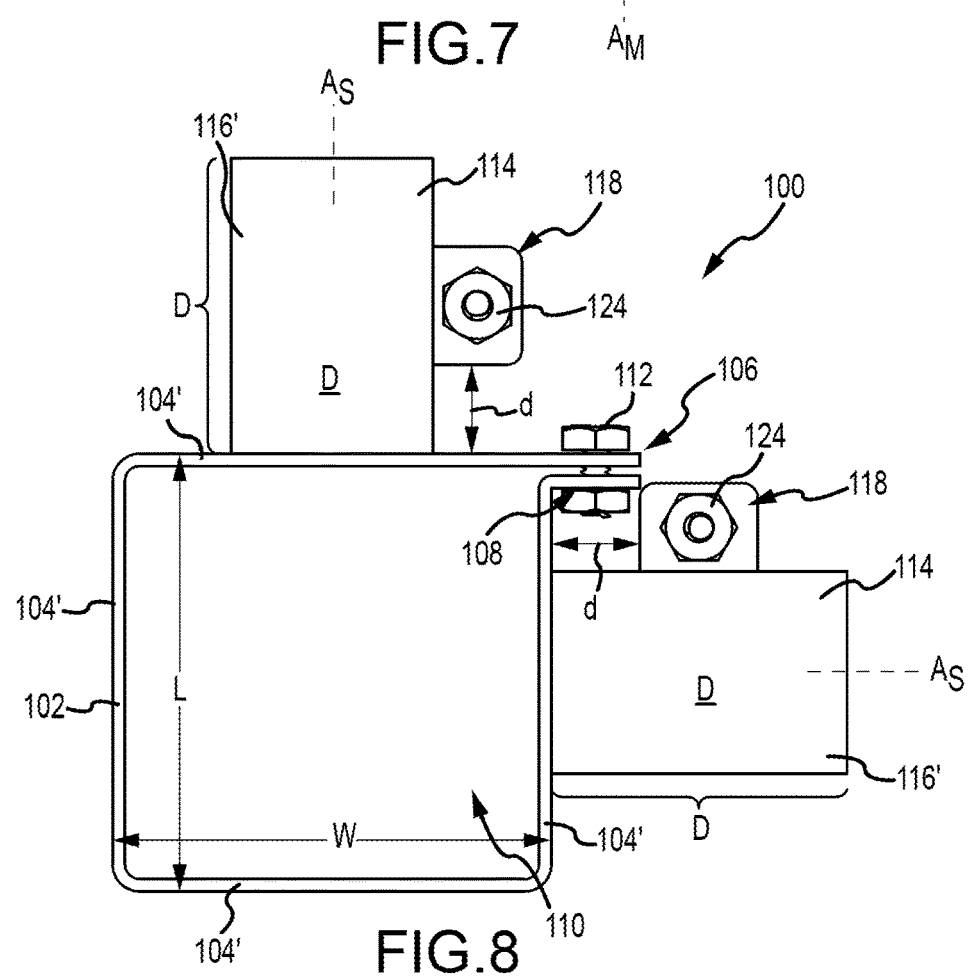

FIGS. 1 and 2 depict an upper perspective view and a lower perspective view, respectively, of a bracket 100 for an article. FIGS. 1 and 2 are described concurrently. The bracket 100 includes a main collar 102, which in this case is a deformed metal plate 104. The plate 104 has a first end 106 and a second end 108 disposed adjacent thereto. The first end 106 and second 108 are also discrete from each other; that is, the end 106, 108 are not joined together by welding, brazing, soldering, or any other affixation technique generally considered in the art to be permanent. The plate 104 may be deformed so as to form a throat 110 or through passage having any number of walls 104', in this case, four walls 104'. The throat 110 may be open at both an upper and lower end of the bracket 100. In other examples, the bracket may be capped at least partially at one end on the throat. Each wall 104', in one example, may be a portion of the deformed plate 104 that is proximate a structural element of the article when that structural element is inserted in the throat 110. The two ends 106, 108 are spanned by one or more fasteners 112, such as bolts, that pass through a corresponding opening (not shown) defined by each end 106, 108 of the plate 104. Tightening of the fasteners 112 brings the two ends 106, 108 closer together, thus reducing the dimensions of the throat 110, so as to hold fast the structural element disposed therein.

Extending from two adjacent sides of the main collar 102 are two subsidiary collars 114. Other configurations of subsidiary collars 114 are contemplated (e.g., subsidiary collars extending from opposite sides of the main collar 102, or subsidiary collar(s) extending from one, three, or four sides of the main collar 102). Depending on the number and orientation of the subsidiary collars, different brackets configured for specific applications or locations in an article may be manufactured. Each subsidiary collar 114, like the main collar 102, is formed by a deformed metal plate 116 having two ends 118, 120 discrete from, and adjacent to, each other. In this case, the two ends 118, 120 have a size reduced from that of an overall width of the plate 116 (that is, the ends 118, 120 are narrower than the remainder of the plate 116). In other examples, the ends 118, 120 may be the same width as the plate 116 itself. Each deformed plate 116 forms a throat 122 having any number of walls 116'. The two ends 118, 120 are spanned by one or more fasteners 124 such as bolts that pass through corresponding openings (not shown) in the ends 118, 120. As with the fasteners 112 associated with the main collar 102, tightening the fasteners 124 reduces the dimensions of the associated throats 122, so as to hold fast the structural element disposed therein. The edge portion of each wall 104' is generally the portion of the wall that is nearest, and in cases abutting, the wall 104'.

The subsidiary collars 114 are fixed to the sides of the main collar 102 so as to allow for deflection of certain of the walls 116' of the subsidiary collars 114 when the fasteners 124 are tightened. Each subsidiary collar 114 includes a number of walls 116' that abut, or are otherwise adjacent to, a wall 104' of the main collar 102' at an edge of the subsidiary collar wall 116'. One or more of these subsidiary collar walls 116' may be fixed to the main collar wall 104' at an edge portion. The remaining subsidiary collar walls 116' need not be so fixed at the edge portions; as such, when the fasteners 124 are tightened, the ends 118, 120 of the plate 116, as well as the unfixed edge portions of the walls 116', are able to deflect, thus reducing the inner dimensions of the throat 122 so as to secured a structural element located therein. As to which edge portions of the subsidiary collar walls 116' are fixed or unfixed, a number of configurations are contemplated.

The term "fixed" as used in the context of the main collar 102 and subsidiary collars 114 generally describe a connection considered permanent in the art. That is, once a subsidiary collar 114 is fixed to the main collar 102, this fixation can generally not be removed without cutting or permanent deformation of the bracket 100. Examples of such fixing includes welding, braising, or soldering (depending on material type). For brackets made from robust plastics, chemical adhesives may also be used.

The subsidiary collar walls 116' are labeled A-E in FIGS. 1 and 2. In one example, only an edge of wall C is fixed to the main collar wall 104', thus allowing walls A, B, D, and E to deflect when the fastener 124 is tightened. In another example, each of walls B-D are fixed to the main collar wall 104', thus allowing walls A and E to deflect. In yet another example, only wall B is fixed to the main collar wall 104', thus allowing walls A and C-E to deflect. In still another example, only wall A is fixed to the main collar wall 104', thus allowing walls B-E to deflect. Other fixation configurations are contemplated. In certain examples, only portions of an edge of a given wall 116' are fixed to the main collar wall 104'. In general, it may be desirable that, if either of wall A or E are fixed to the main collar wall 104', the other of wall A or E is not so fixed, to ensure proper deflection of the walls 116'. Additionally, an entire edge of each wall 116 may be fixed, or only a portion thereof may be fixed.

Each of the main collar 102 and the two subsidiary collars 114 define an axis $A_M$ or $A_S$, respectively. Relative orientations of the axes $A_M$, $A_S$ are based on the locations and arrangements of the associated collars 102, 114. In the depicted example bracket 100, each of the axes $A_M$, $A_S$ are disposed substantially orthogonal to each other. Depending on the configuration of the collars 102, 114 (including but not limited to the number of walls of each collar, number of subsidiary collars in a bracket, desired application of the bracket, etc.) other orientations of the axes $A_M$, $A_S$ are possible and contemplated.

FIGS. 3-8 depict various orthogonal views of the bracket 100 of FIGS. 1 and 2. FIGS. 3-8 are described concurrently. A number of elements of the bracket 100 are described above with regard to FIGS. 1 and 2 and, as such, are not necessarily described further. Each of the main collar 102 and the subsidiary collars 114 may be characterized as having a length L, width W, and a depth D. In this example, the length L and width W dimensions correspond to internal dimensions of the respective throats 110, 122 of each of the main collar 102 and the subsidiary collars 114. The depth D dimension of the main collar 102 corresponds to the dimension of the plate 104 between the open ends of the throat 110 of the main collar 102. As to the subsidiary collars 114, the depth D dimension corresponds to the dimension of the subsidiary collar 114 as measured from an adjacent wall 104' of the main collar 102 to an open end of the throat 122 of the subsidiary collar 114 that receives a structural element (not shown).

The position of the subsidiary collars 114 relative to the walls 104' of the main collar 102 may vary as required or desired for a particular application. In the depicted bracket 100, the subsidiary collars 114 are each approximately centered horizontally on the width W or length L of an adjacent wall 104' of the main collar 102. The subsidiary collars 114 are vertically positioned on the walls 104' of the main collar 102 such that an upper wall 116' (more specifically, wall B) is substantially level with an edge of the main collar 102. This forms a generally level upper surface of the main collar 102, which may be desirable when using the bracket 100 in the construction of articles such as tables. Other positions of the subsidiary collars 114 are contemplated. The ends 118, 120 of the subsidiary collars 114 are disposed a distance d from a wall 104' of the main collar 102.

This distance d may generally be sufficient to allow tool access to and manipulation of the bolts 124.

The throats 110, 122 of each of the main collar 102 and subsidiary collars 114 are depicted as having smooth interior surfaces. When the fasteners 112, 124 are tightened, one or both of the interior dimensions (e.g., length L and width W) are reduced. This reduction in dimension(s) allows the walls 104' and 116' to form a friction fit with the structural elements located therein. This friction fit, even with smooth interior surfaces, is generally sufficient to tightly hold the structural elements within the throats 110, 122. In other examples, however, the interior surfaces may be rough, textured, or include projecting or raised teeth, nubs, ribs, or other protrusions to help further prevent dislocation of the structural elements secured in the throats 110, 122.

Figure 9:
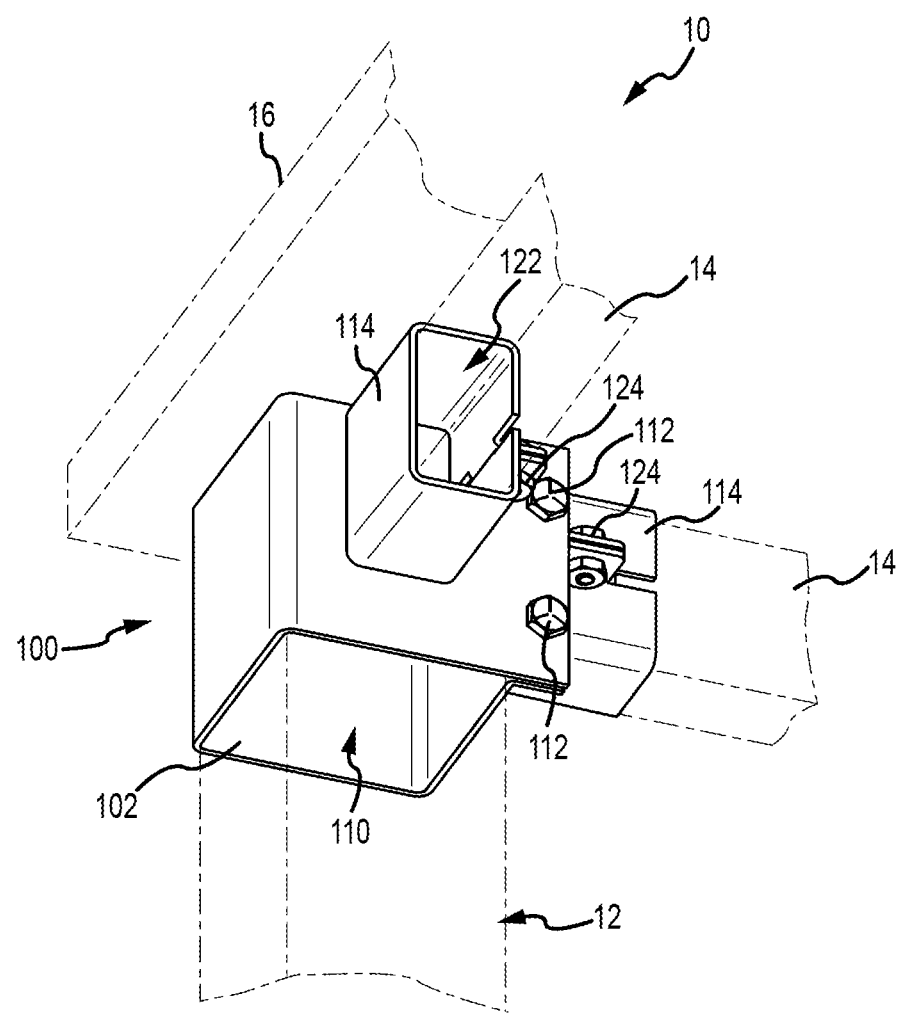
FIG. 9 depicts a partial perspective view of an article formed at least partially with the bracket of FIG. 1.

FIG. 9 is partial perspective view of an article 10 formed at least partially with the bracket 100 of FIG. 1. The structural elements of the article 400 are depicted in dashed lines, for illustration purposes. The article 10 may be a table, only a single corner of which is depicted. FIG. 9 depicts a leg 12, two frame members 14, a top 16, and the bracket 100. To form the table 10, the leg 12 is inserted into the throat 110 of the main collar 102. One frame member 14 is inserted into each of the throats 122 of the subsidiary collars 114. The various fasteners 112, 124 may be tightened to secure the respective structural member into its associated throat 110, 122. This process is repeated for any number of corners (typically for in a rectangular table) until a complete support structure is formed. The top 16 may be secured to the frame members 14 as known in the art. Thus, the bracket 100 may be used to quickly and easily form an article such as a table 10.

Figure 10:
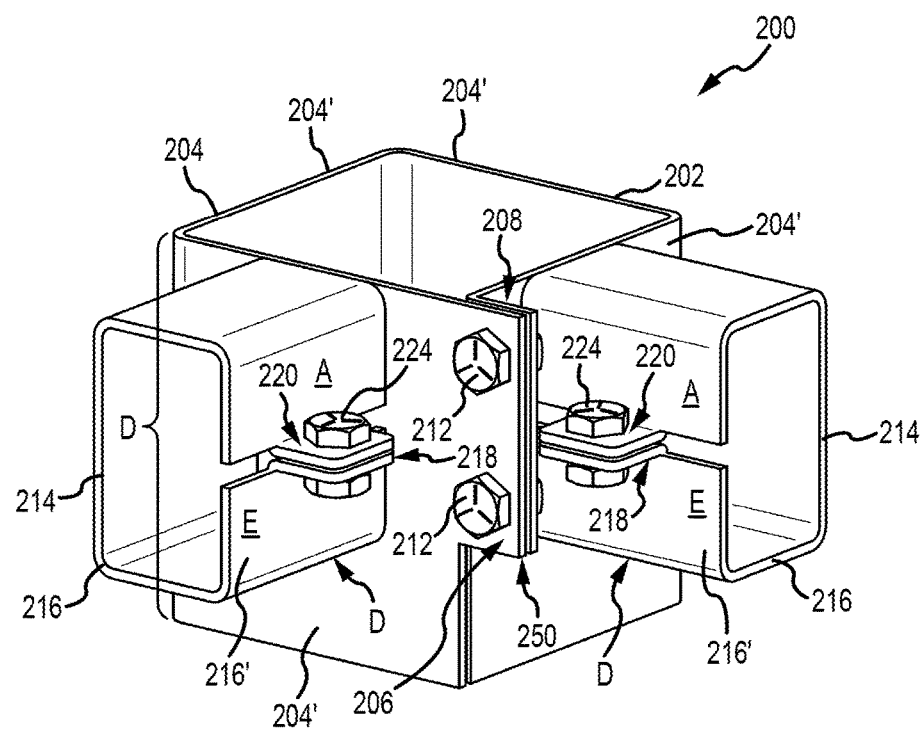
FIG. 10 depicts an upper perspective view of another example of a bracket for an article.

FIG. 10 depicts an upper perspective view of another example of a bracket 200 for an article. A number of elements of the bracket 200 are described above with regard to FIGS. 1-8 share similar reference numbers beginning with "200"; as such, not all elements are necessarily described further in FIG. 9. In this example, the first end 206 and second end of 208 of the plate 204 have dimensions different (e.g., shorter) that the overall depth D of the plate 204. More specifically, the first end 206 and second end 208 define a shortened tab 250 so as to be approximately level with the bottom wall D of the subsidiary collars 214. Thus, when used, for example, as a bracket 200 in an article such as a table, the tab 250 may be more hidden from view behind the subsidiary collars 214, providing a more aesthetically pleasing appearance.

Figure 11:
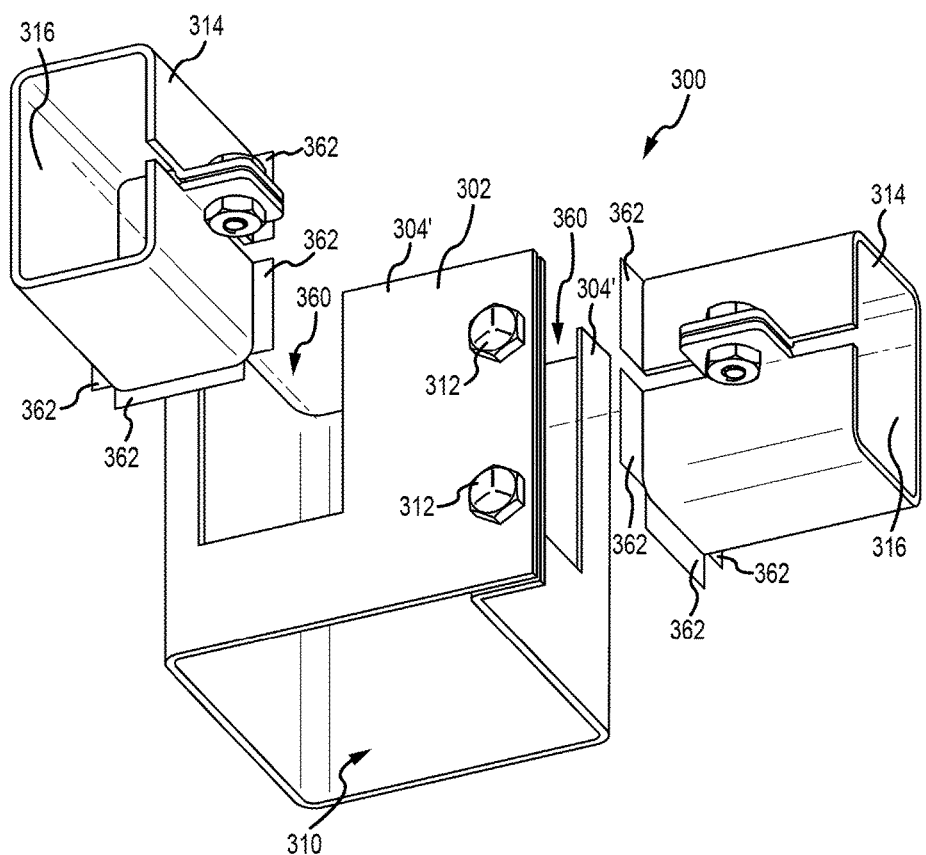
FIG. 11 is an exploded perspective view of another example of a bracket.

FIG. 11 is an exploded perspective view of another example of a bracket 300 for an article. A number of elements of the bracket 300 are described above with regard to FIGS. 1-8 and share similar reference numbers beginning with "300"; as such, not all elements are necessarily described further in FIG. 11. In this example, the bracket 300 includes subsidiary collars 314 that are not fixed to the main collar 302. Instead, walls 304' of the main collar 302 at least partially define an opening 360 configured to receive at least a portion of the subsidiary collars 314. Each subsidiary collar 314 may include one or more flanges 362 that may be selectively coated with an adhesive so as to be adhered to the inner surface of the respective wall 304' of the main collar 302. A robust adhesive will allow for sufficient securement between the flange(s) 362 and the inner surface of the wall 304' of the main collar 306. In another example, low-profile securing fasteners such as rivets may be utilized in lieu of, or in addition to, adhesive. It may be desirable that the flanges 362 are also of a sufficiently low profile to allow for insertion of a structural element into the throat 310 of the main collar 302, without significant interference. In another example, adhesives or rivets need not be used, and the clamping force provided by the main collar 302 (resulting from tightening of the fasteners 312) may be sufficient to secure the subsidiary collars 314 to the main collar 302. In such a case, the flanges 362 would be tightly sandwiched between the inner surface of a respective wall 304' and the structural element (not shown) disposed in the main collar 302. Another example of the bracket 300 depicted in FIG. 11 contemplates a bracket 300 having walls 304' that completely define the depicted openings 360. In such a bracket 300, the subsidiary collars 314 may be manipulated into the openings 360 via insertion through the throat 310. A slit defined by the wall 304' and in communication with each opening 360 may allow for easy passage of the first end 318 and second end 320 of the plate 316 that forms each subsidiary collar 314. Adhesives or other fasteners on the flanges may or may not be utilized.

Brackets described in this application may include main and subsidiary collars sized to receive and secure elongate structural members of various dimensions. Examples include brackets having a main collar sized to accommodate nominal 4"×4" lumber, with subsidiary collars sized to accommodate nominal 2"×3" or 2"×4" lumber. Other examples, such as 3"×3" (main) and 2"×2" (subsidiary), 6"×6" (main) and 2"×4" (subsidiary), 8"×8" (main) and 4"×4" (subsidiary), and 6"×6" (main) and 2"×3" (subsidiary) are also contemplated. Additionally, brackets may be fabricated to be used in conjunction with lumber other than that having rectangular cross sections. Round collars may be used for dowels, while other polygonal collars may also be utilized. Additionally, brackets may be formed having main collars with a first shape (e.g., rectangular) and subsidiary collars with a second shape (e.g., round). Brackets may further be manufactured for non-wood structural elements such as metal or plastic tubing or solid elongate elements. Brackets may be formed of any material as required or desired for a particular application. In examples, metals such as steel, stainless steel, iron, brass, copper, aluminum, or others may be utilized. Robust injection molded plastics displaying acceptable elasticity are also desirable.

The brackets described herein generally utilize collars formed on a single, defined plate. In other examples, however, one or more of the collars may be formed from a plurality of discrete plates that are welded, soldered, or brazed along edges thereof. In general, collars that deform when fasteners (bolts) are rotated are desirable to form a robust clamping connection of the associated structural element; each collar need not be formed of a single plate.

Figure 12:
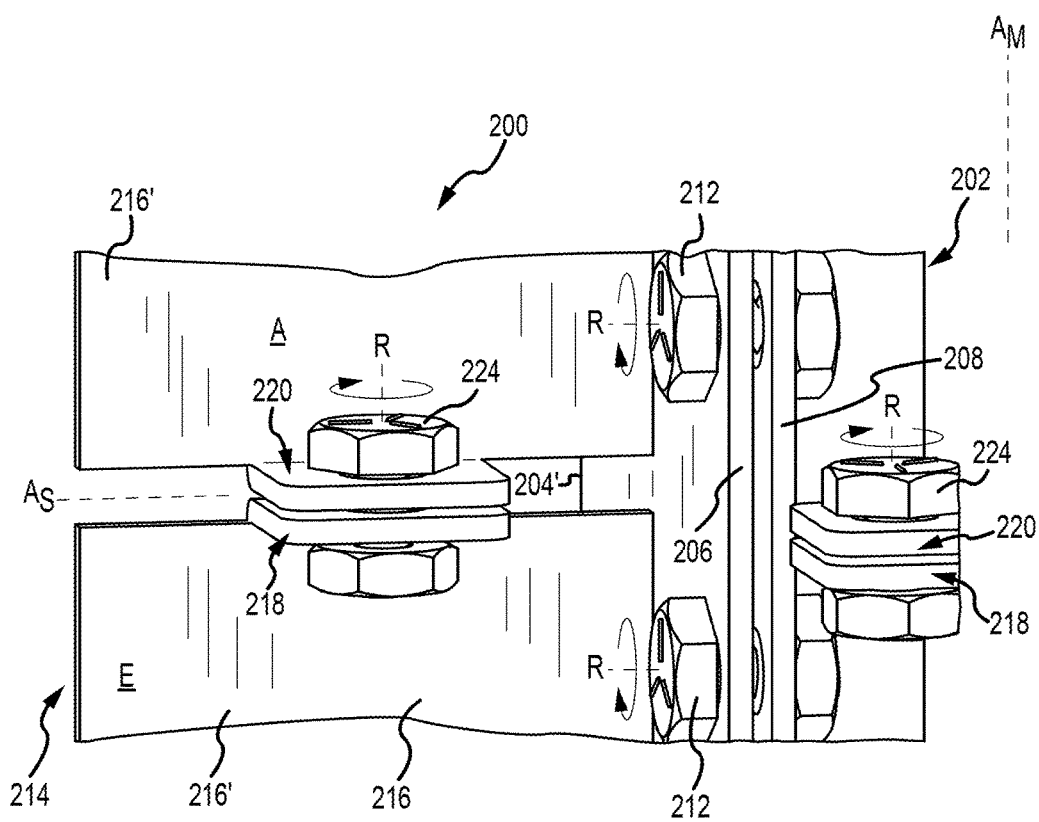
FIG. 12 depicts an enlarged partial perspective view of the bracket of FIG. 10.

FIG. 12 is an enlarged partial perspective view of the bracket 200 of FIG. 10. A number of elements of the bracket 200 are described above with regard to FIG. 10 and, as such, are not necessarily described further. Moreover, the following paragraph describes the bracket 200 of FIG. 10. The teachings herein are generally equally applicable to the other brackets 100, 300 described herein. As described elsewhere herein, as the fasteners 224 (a bolt and nut) are rotated R, the first end 218 and second end 220 of the plate 216 that forms the subsidiary collars 214 are drawn closer together. This deflects at least the walls 216' that are not fixed to the wall 204' of the main collar 202. The walls 216' that are fixed to the collar wall 204' may also deflect slightly. Deflection causes a reduction in dimension(s) of the throat of the subsidiary collar 214, holding tightly the structural members located therein. The fasteners 212 (bolt and nut) on the main collar 202 perform similarly. Rotation R thereof draws the first end 206 and second end 208 closer together, thus tightly clamping the main collar 204 around a structural element disposed therein.

Figure 12A:
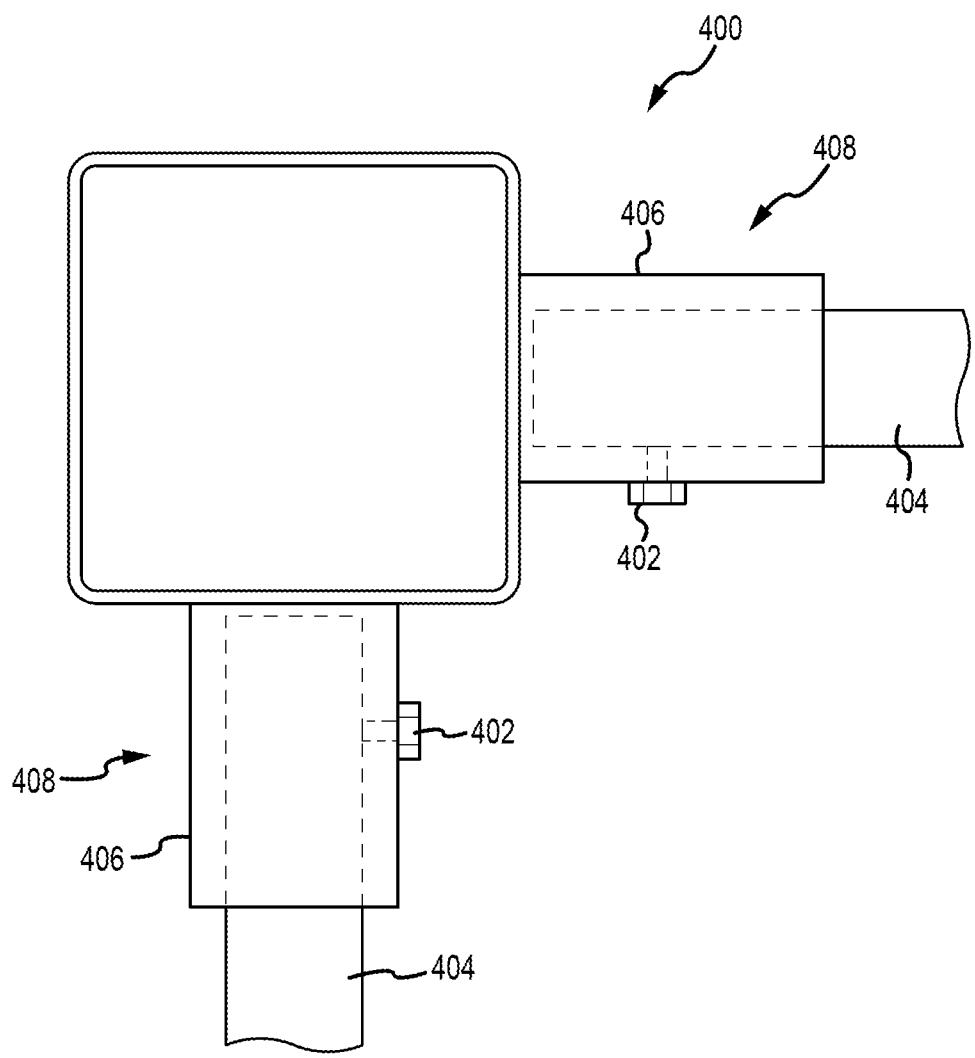
FIG. 12A depicts a prior art bracket.

As can be seen in FIG. 12 and other figures, axes of rotation R of each of the fasteners 212, 224 are generally skew to the axes $A_M$, $A_S$ of the associated collar 202, 214. This helps ensure a robust and significant clamping force of each collar, 202, 214 around an associated structural element. This configuration displays a marked improvement over brackets 400 such as depicted in FIG. 12A that utilize a flat-tipped bolt 402 to bias a structural element 404 into an opposite wall 406 of the collar 408. Such brackets 400 may become loose over time, or the bolt 402 may penetrate the structural element 404, decreasing the applied force.

Figure 13:
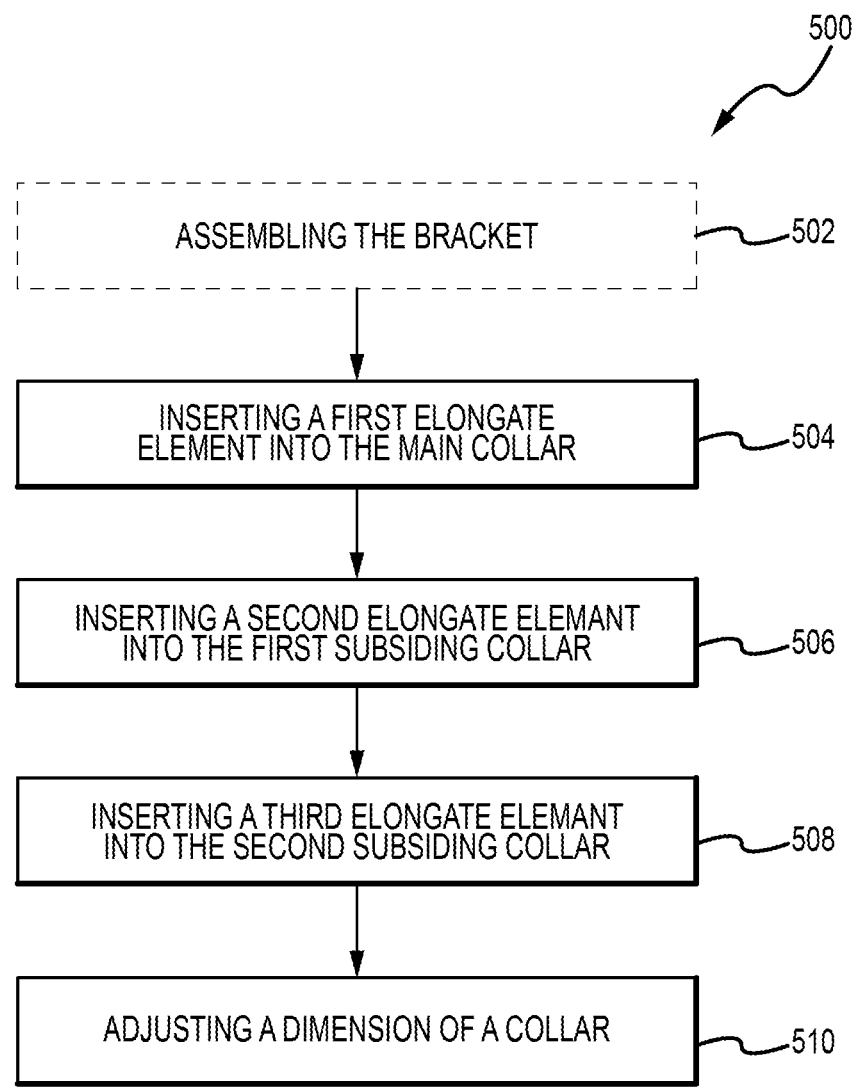
FIG. 13 is a method of manufacturing an article using a bracket such as described herein.

FIG. 13 is a method 500 of manufacturing an article using a bracket such as described herein. The method 500 begins with assembling the bracket (if using a bracket similar to that depicted in FIG. 11), optional operation 502. The method 500 includes inserting a first elongate structural element or member into a main collar, operation 502. A second elongate structural element or member is inserted into a first subsidiary collar, operation 504. A third elongate structural element or member is inserted into a second subsidiary collar, operation 506. Once any of the various elongate structural elements are inserted into their respective collars, the dimension of the collar may be adjusted, operation 508. Normally, adjustment of the dimension corresponds to reducing at least one dimension of the collar. This may be performed, as described herein, by rotating or turning a fastener such as a bolt. Typically, operation 508 contemplates adjusting one or more dimensions of each of the main collar, first subsidiary collar, and second subsidiary collar. This may be performed by rotating at least one fastener associated with each of the main collar, first subsidiary collar, and second subsidiary collar.

Certain terms used herein, e.g., main, first, second, third, vertical, horizontal, opposite, adjacent, length, width, depth, upper, lower, are relative terms used to describe the position, conditions, or features of one or more of the various components of the brackets described herein and are not to be considered limiting. It is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. It must be noted that, as used in this specification, the singular forms "a," "an," and "the" include plural referents unless the context clearly dictates otherwise.

It will be clear that the systems and methods described herein are well adapted to attain the ends and advantages mentioned as well as those inherent therein. Those skilled in the art will recognize that the methods and systems within this specification may be implemented in many manners and as such is not to be limited by the foregoing exemplified examples and examples. In this regard, any number of the features of the different examples described herein may be combined into one single example and alternate examples having fewer than or more than all of the features herein described are possible.

While various examples have been described for purposes of this disclosure, various changes and modifications may be made which are well within the scope contemplated by the present disclosure. Numerous other changes may be made which will readily suggest themselves to those skilled in the art and which are encompassed in the spirit of the disclosure.

What is claimed is:

1. A bracket comprising:
    a main collar comprising a first deformed plate having a first end and a second end disposed adjacent to and discrete from the first end;
    a first subsidiary collar comprising a second deformed plate having a first end and a second end disposed adjacent to and discrete from the first end, wherein the first end and the second end are spanned by a bolt, wherein the first subsidiary collar comprises a first subsidiary collar edge adjacent the main collar, and wherein the first subsidiary collar edge comprises:
        a first edge portion adjacent the first end and fixed to the main collar, and
        a second edge portion adjacent the second end and unfixed to the main collar so as to deflect when the bolt is tightened; and
    a second subsidiary collar comprising a third deformed plate having a first end and a second end disposed adjacent to and discrete from the first end, wherein the second subsidiary collar comprises a second subsidiary collar edge adjacent the main collar, and wherein at least a portion of the second subsidiary collar edge is secured to the main collar.

2. The bracket of claim 1, wherein each of the main collar, the first subsidiary collar, and the second subsidiary collar comprise a respective axis, and wherein each of the main collar axis, the first subsidiary collar axis, and the second subsidiary collar axis are disposed substantially orthogonal to each other.

3. The bracket of claim 1, wherein each of the main collar and the second subsidiary collar comprise a bolt spanning the first end and the second end of each of the respective collars, and wherein each of the bolts is configured to adjust a distance between the first end and the second end of each of the respective collars.

4. The bracket of claim 1, wherein the first subsidiary collar edge comprises at least three edge sections, wherein at least two edge sections of the at least three edge section are secured to the main collar.

5. The bracket of claim 4, wherein at least two edge sections of at least three edge sections are not secured to the main collar, so as to be deflectable relative to the main collar.

6. The bracket of claim 4, wherein at least three edge sections further comprises:
    a third edge section adjacent the first edge section;
    a fourth edge section adjacent the third edge section; and
    a fifth edge section adjacent and between the fourth edge section and one of the two edge sections.

7. The bracket of claim 6, wherein the fifth edge section is not secured to the main collar, so as to be deflectable relative to the main collar.

8. A bracket comprising:
    a main collar comprising a unitary bent plate comprising a first end defining a first side surface of the main collar, and a second end disposed adjacent the first end, wherein the main collar is configured to be adjustably secured to a first elongate element;
    a first subsidiary collar secured to the first side surface of the main collar and configured to be adjustably secured to a second elongate element with a bolt spanning a first end of the first subsidiary collar and a second end of the first subsidiary collar, wherein the first subsidiary collar comprises:
        a first edge portion adjacent the first end and fixed to the main collar, and a second edge portion adjacent the second end and unfixed to the main collar so as to deflect when the bolt is tightened; and a second subsidiary collar secured to the main collar and configured to be adjustably secured to a third elongate element.

9. The bracket of claim 8, wherein each of the main collar and the second subsidiary collar each comprise at least one bolt for adjustably securing a respective one of the collars about a respective one of the elongate elements.

10. The bracket of claim 8, wherein each of the main collar, the first subsidiary collar, and the second subsidiary collar comprise an axis, and wherein the main collar axis is disposed substantially orthogonal to both of the first subsidiary collar axis and the second subsidiary collar axis.

11. The bracket of claim 10, where the first subsidiary collar axis and the second subsidiary collar axis are disposed substantially orthogonal to each other.

12. The bracket of claim 8, wherein the first subsidiary collar comprises an edge facing the main collar, wherein the edge comprises a length, and wherein less than an entire portion of the length is secured to the main collar.

13. The bracket of claim 8, wherein the bolt comprises a plurality of bolts for adjustably connecting the first end to the second end.

14. A method of manufacturing an article having a bracket comprising a main collar, a first subsidiary collar at least partially secured to a first outer surface of the main collar, and a second subsidiary collar at least partially secured to a second outer surface of the main collar, the method comprising:

inserting a first elongate element into the main collar;

inserting a second elongate element into the first subsidiary collar to abut the first outer surface;

inserting a third elongate element into the second subsidiary collar to abut the second outer surface; and adjusting a dimension of at least one of the main collar, the first subsidiary collar, and the second subsidiary collar so as to secure therein a respective one of the elongate elements.

15. The method of claim 14, wherein adjusting the dimension comprises turning at least one fastener.

16. The method of claim 15, wherein the fastener comprises a bolt.

17. The method of claim 14, wherein adjusting the dimension comprises adjusting a dimension of each of the main collar, the first subsidiary collar, and the second subsidiary collar.

* * * * *